United States Patent [19]

Joao et al.

[11] Patent Number: 5,513,244
[45] Date of Patent: Apr. 30, 1996

[54] REMOTE-CONTROLLED ANTI-THEFT, THEFT REPORTING, OR VEHICLE RECOVERY SYSTEM AND METHOD FOR MOTOR VEHICLES

[76] Inventors: Raymond A. Joao; Raymond D. Joao, both of 122 Bellevue Pl., Yonkers, N.Y. 10703; Thomas Garben, 145 Glendale Rd., Scarsdale, N.Y. 10583

[21] Appl. No.: 489,238

[22] Filed: Jun. 12, 1995

Related U.S. Application Data

[63] Continuation of Ser. No. 73,755, Jun. 8, 1993, abandoned.

[51] Int. Cl.$^6$ .................................................. H04M 11/00
[52] U.S. Cl. ................... 379/58; 379/57; 379/39; 379/44; 340/425.5; 340/539
[58] Field of Search .................. 379/57, 58, 59, 379/39, 40, 41, 42, 44, 49, 51; 340/425.5, 426, 441, 531, 539, 825.47, 825.31, 825.34

[56] References Cited

U.S. PATENT DOCUMENTS

| | | | |
|---|---|---|---|
| 4,882,579 | 11/1989 | Siwiak | 340/825.47 X |
| 5,081,667 | 1/1992 | Drori et al. | 379/59 |
| 5,113,427 | 5/1992 | Ryoichi et al. | 379/57 |
| 5,276,728 | 1/1994 | Pagliaroli et al. | 379/58 |

Primary Examiner—Curtis Kuntz
Assistant Examiner—G. J. Oehling
Attorney, Agent, or Firm—Raymond A. Joao

[57] ABSTRACT

A remote-controlled anti-theft or theft-deterrent system and method, for motor vehicles, is disclosed which comprises a transmitting device, wherein the transmitting device is capable of transmitting data signals to at least two remote locations, a first receiving device for receiving the data signals transmitted from the transmitting device at a first of the at least two remote locations, a second receiving device for receiving the data signals transmitted from the transmitting device at a second of the at least two remote locations, a first control device associated with the first receiving device for processing the data representative of the data signals, wherein the first control device processes the data representative of the data signals and issues one of a disable signal and a re-enable signal to one of a vehicle's ignition system, a vehicle's fuel pump system and a vehicle's auxiliary equipment system one of instantaneously and after a time delay period, and a second control device associated with the second receiving device for processing the data representative of the data signals, wherein the second control device processes the data representative of the data signals and provides information indicating at least one of identification of the motor vehicle and information indicative of the function to be controlled by the data signals.

18 Claims, 3 Drawing Sheets

REMOTE-CONTROLLED ANTI-THEFT, THEFT REPORTING, OR VEHICLE RECOVERY SYSTEM AND METHOD FOR MOTOR VEHICLES

This is a continuation application of application Ser. No. 08/073,755, filed Jun. 8, 1993 now abandoned.

FIELD OF THE INVENTION

The present invention pertains to a remote-controlled anti-theft and/or theft-deterrent apparatus and method, for motor vehicles, which provides for an instantaneous, as well as for a deferred, anti-theft and/or theft deterrent response to a motor vehicle theft, or for the prevention thereof.

BACKGROUND OF THE INVENTION

Anti-theft and/or theft-deterrent devices for motor vehicles are known, in the prior art, for preventing or thwarting the theft of motor vehicles. These known devices may be of the active or passive variety and are typically available in many forms (i.e. steering wheel locks, hood locks, ignition system cut-off devices, alarms, etc.). In some cases, these devices may be of a very simple design, while in other cases, they may be of a more sophisticated design. However, as is well known, these known anti-theft and/or theft-deterrent devices and systems may be easily defeated by car thieves, and especially, by professional car thieves. Experience has shown that even the most sophisticated of anti-theft and/or theft-deterrent devices may be defeated by an experienced, and determined, vehicle thief.

In recent times, an even more disturbing criminal practice involving the theft of motor vehicles has rendered most of these anti-theft and/or theft-deterrent devices virtually useless. This criminal practice has gained widespread attention and is known as car-jacking. Car-jacking usually occurs when a thief or thieves confront a motorist or motor vehicle operator, when the motor vehicle engine is running, or when the car thief obtains easy access to the motor vehicle ignition keys and to the motor vehicle, either by force or by the threat of force, thereby bypassing, and rendering useless, any of the widely known anti-theft and/or theft-deterrent devices, thereby gaining control and/or possession of the motor vehicle. In these instances, the motorist or motor vehicle operator is well advised to surrender the motor vehicle. However, once surrendered, the motor vehicle is virtually lost to the car thief.

The above-described recent car-jacking practices have also given rise to the introduction and/or to the suggestion of anti-theft and/or theft-deterrent devices which attempt to defeat the ultimate vehicle theft, such as caused by car-jacking, by causing the motor vehicle to become disabled during the "getaway" such as by shutting off the power to the motor vehicle's engine. However, these devices have major disadvantages and drawbacks in that they could shut-off the vehicle's engine power at an inopportune instant in time, thereby causing a dangerous condition to exist, which could lead to an accident which may cause injuries to individuals as well as damage to property. These accidents may arise when the motor vehicle's power is suddenly shut-off when the vehicle is in motion, which condition could cause the vehicle to suddenly, or even gradually, lose power on a roadway or highway, while traveling at a moderate or at a high rate of speed and/or when a power steering and/or a power braking system, which derives its power from the vehicle's engine, suddenly loses power upon the loss of the engine power. As noted above, accidents such as these may result in injuries to people, both inside and outside the vehicle, as well as property damage caused by, and to, the vehicle.

The above described disadvantages and drawbacks of the prior art devices may also pose accident liability concerns to those manufacturers and/or sellers of these devices, as well as to the owner or operator of the motor vehicle, as these entities and/or individuals may be held liable for the injuries and the damages sustained as a result of the above described accidents.

The present invention provides an apparatus and a method for overcoming the disadvantages and drawbacks which are associated with the known prior art anti-theft and/or theft-deterrent devices.

SUMMARY OF THE INVENTION

The present invention is directed to a remote-controlled anti-theft and/or theft-deterrent apparatus and method which overcomes the disadvantages and drawbacks of the prior art anti-theft and/or theft-deterrent devices. The present invention also provides for a remote-controlled anti-theft and/or theft-deterrent apparatus and method which can provide for an instantaneous, as well as for a deferred, anti-theft and/or theft-deterrent system response to a motor vehicle theft, or for the prevention thereof. Further, the present invention may be utilized in conjunction with local law enforcement offices and agencies so as to provide a means by which a motor vehicle theft may be reported so as to enable a rapid response thereto by the office or agency.

The apparatus of the present invention comprises a transmitter system, for transmitting an electrical, an electronic, or an electro-magnetic, signal upon the activation of the transmitter by a motor vehicle owner or authorized operator. The transmitter system consists of a user interface device and a transmitting device. The user interface device provides the means by which the motor vehicle owner or authorized operator may access or activate the apparatus and/or provide control over the apparatus. The transmitting device transmits a signal, in response to the owner or authorized operator's accessing and/or activation of the transmitter system and the apparatus. The transmitter system is typically a remote-control system, which is separate from, and which is not electrically connected with, the remainder of the apparatus. In this manner, the transmitter system is not located within the motor vehicle. The transmitter system should also be capable of transmitting signals over long distances and should also be capable of transmitting a multitude of signals.

The apparatus also comprises a receiver for receiving the signals which are transmitted by the transmitter system. The receiver may be any receiver or receiving device which is capable of receiving remote electrical, electronic and/or electro-magnetic signals, which may be transmitted by the transmitter system, as well as being capable of receiving any of the multitude of signals which may be transmitted thereby or therefrom. The transmitter system/receiver combination, of the apparatus of the present invention, may be implemented by using a telephone/telephone beeper system, which systems are well known in today's telecommunication industry and practices. It should be noted, however, that any transmitter system/receiver combination, which allows for a transmission of remote signals and, in addition, a multitude of remote signals, to a receiver, over long distances, may be utilized with the apparatus of the present invention.

The receiver should also be capable of generating distinct digital signals, i.e. electrical, electronic, and/or electromagnetic signals, which may be indicative of the transmitted signal, or a portion thereof. At least a portion of the transmitted signal should include a valid access code or signal which accesses the apparatus, and in particular, the receiver, and a valid command code, by which code a vehicle owner or authorized operator may exercise control over the apparatus.

The apparatus further comprises a controller, which is electrically connected with the receiver and which receives the digital signals, or portions thereof, which are generated by the receiver. The controller may be any type of digital processing device, or computer, such as a microprocessor. The controller also has associated therewith a read only memory device (ROM), for storing operational program data, and a random access memory device (RAM), for storing the data which is to be processed by the apparatus. The use of a microprocessor as the controller provides for versatility in programmability, as well as provides for an apparatus which can be made as small in size as possible. By providing for an apparatus which is as small in size as possible, a more concealed installation of the apparatus in the motor vehicle can be achieved. It is also envisioned that the apparatus of the present invention may be installed in the motor vehicle during the vehicle's manufacture and/or assembly so as to enhance its concealment from a thief or thieves.

The controller is electrically connected to the motor vehicle's ignition system and may, or may not, be connected to the vehicle's ignition system via an ignition system interface. The controller transmits signals to, and may receive signals from, the vehicle's ignition system. Digital command signals and/or codes are utilized, in order to disable and/or to re-enable or reset the vehicle's ignition system.

The apparatus may also comprise, and the controller may also be electrically connected either directly, or indirectly via an interface device, to a motor vehicle fuel pump system, which may be de-activated so as to cut-off the flow of fuel to the vehicle's engine.

The apparatus may also comprise, and the controller may also be electrically connected, either directly, or indirectly via an interface device, to one or more of a vehicle auxiliary equipment system or systems, which may include a loud siren or alarm, which may be located in the passenger compartment of the motor vehicle and which may be activated so as to make it unbearable for an intruder to remain inside the motor vehicle passenger compartment, an external siren or alarm, which is capable of producing a loud sound, which may be activated so as to draw attention to the motor vehicle, a horn or horns, which may be activated so as to blare continuously or intermittently so as to also draw attention to the motor vehicle, and/or the vehicle's external light systems, which may include the vehicle's head lights, tail lights, or flashers, which may be activated so as to be constantly illuminated or which may be activated to flash on and off repeatedly.

The vehicle auxiliary equipment system or systems, to which the controller may be connected to, either directly or indirectly via an interface device, may also include a power door locking system, which may be activated so as to secure the vehicle's passenger compartment thereby preventing an entry thereto, or an exit therefrom, and/or a hood locking system, which may be a mechanical hood locking system, which may be activated so as to lock the vehicle's hood so as to prevent an entry into the vehicle's engine compartment. The apparatus may also comprise any necessary vehicle auxiliary equipment system interface devices which may be needed in order to facilitate the required interfacing between the controller and the particular vehicle auxiliary equipment system(s). The vehicle auxiliary equipment system or systems, which may include other systems or devices, located within, or utilized with, the motor vehicle, are optional and may be utilized as desired.

Upon the occurrence, or the discovery thereof, of a motor vehicle theft, the owner or authorized operator of the motor vehicle may activate the apparatus by entering a valid access code into the transmitter interface, thereby activating a transmission from the transmitting device. The entry of a valid access code, and the resulting transmission of an access signal corresponding thereto, to the receiver of the apparatus, results in the apparatus being accessed. Upon receiving the transmitted access signal, the receiver will typically generate a signal which is indicative of the receiver's receipt of the signal. The controller is activated upon the accessing of the receiver and the apparatus.

The receiver, or the communication system which services the receiver, may also transmit a signal back to the transmitter system which is indicative of the fact that the receiver and the apparatus have been accessed. For this, the receiver may also be equipped with a transmitting device of its own, while the transmitter system may be correspondingly equipped with its own receiver device. The above sequence of events are analogous to those which occur in a telephone/telephone beeper system, wherein, when the beeper has "answered the call" and has been activated or accessed, it awaits the entry of a telephone code or number. This indication by the receiver may then typically be followed by a period of silence, during which period, the owner or authorized operator may enter a command code, such as a vehicle disable code, a vehicle re-enable or reset code, or a cancel code, into the transmitter interface.

The command code is then transmitted by the transmitter system or transmitting device, and is received by the receiver. A command code received signal may then be transmitted back to the transmitter system by the receiver or beeper, or by the communication system which services the beeper, so as to provide an indication that an authorized command code has been received by the receiver and the apparatus. The command code data, or signals corresponding thereto, are then transmitted to the controller for identification thereof and for further processing, if necessary.

In a situation when the motor vehicle has been stolen and the owner or authorized operator wants to prevent or thwart the theft, the command code would be a vehicle disable code. Similarly, if the owner or authorized operator wants to re-enable or reset the apparatus, such as when the motor vehicle has been recovered or found, the command code would be a vehicle re-enable or reset code. If the owner or authorized operator wishes to cancel the accessing of the apparatus, a code other than the disable or the re-enable or reset code may be entered. Once the command code has been entered, the receiver may transmit a signal to the transmitter, which is indicative of the receipt of the command code. As noted above, the command code or the data representative thereof, if valid, will be transmitted to, or read by, the controller for command code identification and for subsequent processing, if necessary.

The receiver, upon receipt of the access code, may generate an interrupt in the controller, which interrupt will activate an interrupt service routine. The command code data is then transmitted to, or read by, the controller and a processing routine is performed in order to identify the command code or the command code data. Once the command code or command code data has been identified, the controller will control the operation of the apparatus so that the appropriate processing routines, and apparatus functioning, will be performed.

If a valid disable code has been identified, the controller will determine whether the vehicle's ignition system is on. This will require the controller to monitor the vehicle's ignition system. If the vehicle's ignition system is on, the controller will enter into a delay loop routine so as to repeatedly test the ignition system after a predetermined delay period. This delay loop routine serves to prevent the vehicle's ignition system from being shut down while the vehicle's engine is running. Such a design feature serves to prevent an accident, such as when a moving vehicle suddenly looses engine power or the power assist means in safety systems such the power steering and/or power brake systems. The controller will interrogate the vehicle's ignition system after a pre-determined delay period and will continue to do so until it is determined that the vehicle's ignition system is shut-off or is inactive. It is important to note that the delay period which is chosen should be capable of detecting even the shortest duration of a vehicle's ignition system shut-down.

Once it has been determined that the vehicle's ignition system is shut-off, the controller will issue a disable signal to the vehicle's ignition system. This disable signal will disable the vehicle's ignition system, thereby preventing the re-activation of the vehicle's ignition system and the restarting of the vehicle's engine. If utilized in conjunction with the apparatus of the present invention, the controller may also issue a disable signal so as to disable the vehicle's fuel pump system, thereby preventing fuel from being supplied to the vehicle's engine.

Once the vehicle's ignition system and the vehicle's fuel pump system, if utilized, have been disabled, only a valid re-enable or reset command code signal may be employed to re-enable or to reset these vital vehicle systems thereby enabling the vehicle's engine to be restarted. As will be readily appreciated, a careful placement and installation of the apparatus, within the motor vehicle, will provide for a concealed and/or undetectable apparatus and, therefore, will result in a completely disabled vehicle, until such time as a valid access code, followed by a valid re-enable or reset code, is transmitted, by the owner or authorized operator, in the manner described above.

Upon the disabling of the vehicle's ignition system, and the vehicle's fuel pump system, if utilized, the controller may then issue control signals to activate or to de-activate, whichever the case may be, the various vehicle auxiliary equipment systems, which may be utilized in conjunction with the apparatus. Upon completion of the above operations, the controller will then exit the operational program, which in this case, is an interrupt service routine, and will then await the next accessing and activation of the apparatus by the owner or authorized operator, via an entry of a valid access code into the transmitter system or transmitter interface.

It is possible to provide disable command codes which may selectively disable the vehicle's ignition system, the vehicle's fuel pump system, and/or activate or de-activate any of the vehicle equipment auxiliary systems, as well as to provide different disable command codes which may provide selective control over any one or any combination of the above systems.

Upon the motor vehicle being found or recovered, the owner or authorized operator may once again access the apparatus by entering the valid access code, into the transmitter interface, and then by entering the valid re-enabling or reset command code. As described above, a valid access code will once again initiate the operation of the interrupt service routine described above. The command code data will once again be transmitted to, or read by, the controller and the controller will determine whether the command code is a valid disable command code. If the command code is not a valid disable command code the controller will perform a test to determine if a valid re-enable or reset command code has been entered. If the command code is not a valid re-enable or reset code, the controller will exit the operational program, or the interrupt service routine, and will await the next valid accessing of the receiver and the apparatus. This processing scheme may be indicative of a cancel code transmission or a false alarm in the accessing of the apparatus.

If the entered command code is identified as a valid re-enable or reset command code, the controller, subsequent to this identification, but prior to actually re-enabling or resetting the vehicle's ignition system, the vehicle's fuel pump system, if utilized, and de-activating or re-activating the vehicle's auxiliary systems, whichever the case may be, will perform a test in order to verify that the vehicle's ignition system is still disabled. This feature ensures that no re-enabling or resetting signal will be issued to the vehicle's ignition system or fuel pump system, if utilized, when these systems are not disabled, which signals may cause an interruption in the operation of these systems. This is an added safety feature in the present invention.

If the vehicle's ignition system and/or the vehicle's fuel pump system are disabled, the controller will issue the necessary signals which will re-enable or reset these systems. Shortly thereafter, the controller, if necessary, will issue the necessary signal or signals which may de-activate or re-activate, whichever the case may be, the vehicle's auxiliary equipment systems which are utilized.

It should be noted that it is also possible to provide re-enable or reset command codes which may selectively re-enable or reset the vehicle's ignition system, the vehicle's fuel pump system, and/or deactivate or re-activate any of the vehicle's auxiliary equipment systems, as well as to provide different re-enable or reset command codes which may provide selective control over any one or any combination of the above systems.

Upon the re-enabling or resetting of the vehicle's ignition system and the vehicle's fuel pump system, if utilized, the vehicle will then be ready for operation, barring any need for service and/or for repairs. The controller will then exit the operational program, or the interrupt service routine, and will await the next valid accessing and activation of the apparatus.

If the re-enable or reset command code is not a valid re-enable or reset code, the controller, upon identification thereof, will ignore the received code or data, will exit the operational program, and will await the next valid accessing and activation of the apparatus.

The present invention provides a means by which to prevent an unwanted accessing of, or an unauthorized tampering with, the apparatus by an unauthorized person, as well as, serves to guard against a mistaken accessing of the apparatus such as by a mistakenly transmitted access code and/or command code.

The apparatus and the method of the present invention provide for an apparatus and a method for allowing a motor vehicle owner or authorized operator to safely surrender the motor vehicle under force, or the threat of force, while affording the motor vehicle owner or authorized operator the means by which to take steps to prevent or thwart the theft of the motor vehicle from a safe location or vantage point.

By utilizing command codes which only disable or re-enable or reset the vehicle's ignition system and the vehicle's fuel pump system, if utilized, the motor vehicle owner or authorized operator may also utilize the present invention in order to disable or to re-enable or reset these systems, at any time, such as at night or while at work, and from a remote location. The present invention also provides a means by which an owner or authorized operator may activate or deactivate any one or any combination of the vehicle's auxiliary equipment systems, which may be utilized, in order to prevent a vehicle's theft.

It is also envisioned that the present invention may be utilized in conjunction with local law enforcement offices or agencies in order to report the vehicle theft. In such a system, a receiver, which may be capable of receiving registered vehicle access codes and command codes, may be located at a local law enforcement office or agency such as a local police department. A computer, for processing the codes or data, is utilized in conjunction with the receiver. A display device is also utilized in conjunction with the computer.

It is envisioned that motor vehicle owners or authorized operators may register their vehicle information with their local police department, along with the valid access code and command codes for their apparatus. The receiver may be programmed to receive the access code and the command codes for the apparatus of a given registered vehicle.

The local police department may have a data base of vehicle information which could be correlated with the valid access codes and command codes. In this manner, when a theft of a motor vehicle occurs, or has been discovered, the owner or authorized operator, upon accessing the receiver and the apparatus of his or her motor vehicle, will also access the receiver which is located in the police department. Upon receiving this access code, the receiver at the police department will receive the command code data, which is transmitted. The computer, which is located at the police department, independently of the processing which may be taking place in the vehicle apparatus, will process the received data so as to identify the motor vehicle which is being accessed, as well as to identify the nature of the command code which was transmitted. If a valid disable command code has been transmitted, the computer will alert the police, via the display device, that the motor vehicle has been stolen.

If a re-enable or a reset command code is received, the police would also be alerted so that they may verify the situation with the motor vehicle owner or authorized operator. Invalid codes may also be checked out by the police.

Upon the completion of the above processing, the police could then issue a bulletin or a dispatch thereby reporting the theft of the motor vehicle to its patrol personnel along with information which identifies the motor vehicle.

The use of the present invention in conjunction with a local law enforcement office or agency provides a means by which a motor vehicle owner or authorized operator may take the necessary steps in order to prevent or thwart the vehicle theft, from a safe location and/or vantage point, while also reporting the theft to the police immediately. This may provide the police department with a headstart in trying to recover the motor vehicle and/or to apprehend the thief or thieves as soon as possible after the theft occurs or is discovered.

Accordingly, it is an object of the present invention to provide an apparatus and a method for a remote-controlled, instantaneous or deferred response, anti-theft and/or theft-deterrent system whereby a motor vehicle owner or authorized operator may, from a safe location remote from the location of the motor vehicle theft, disable or re-enable or reset a vehicle's ignition system, a vehicle's fuel pump system, and/or activate or de-activate a motor vehicle's auxiliary equipment system or systems.

It is another object of the present invention to provide an apparatus and a method for a remote-controlled anti-theft and/or theft-deterrent system whereby a multitude of signals may be transmitted to the apparatus so as to allow for a versatile and a selective control of the apparatus and the motor vehicle's systems used in conjunction therewith.

It is another object of the present invention to provide an apparatus and a method for a remote-controlled anti-theft and/or theft-deterrent system which dispenses with the need for a separate remote control unit which is associated with the apparatus.

It is still another object of the present invention to provide an apparatus and a method for a remote-controlled anti-theft and/or theft-deterrent system which provides for the disabling or the re-enabling or resetting of a motor vehicle's ignition system or a motor vehicle's fuel pump system or the activation or de-activation of vehicle auxiliary equipment systems by utilizing conventional touch tone telephone and telephone beeper equipment.

It is another object of the present invention to provide an apparatus and a method for a remote-controlled anti-theft and/or theft-deterrent system which prevents an interruption of a vehicle's ignition system or a vehicle's fuel pump system or vehicle auxiliary equipment systems while the vehicle is operating or is in motion.

It is yet another object of the present invention to provide a remote-controlled anti-theft and/or theft-deterrent system which provides a means by which the motor vehicle owner or authorized operator may access the system while simultaneously alerting a local law enforcement office or agency of the motor vehicle theft.

Other objects and advantages of the present invention will be made apparent to those skilled in the art upon a review of the Detailed Description Of The Preferred Embodiment taken in conjunction with the Drawings which follow.

DESCRIPTION OF THE PREFERRED EMBODIMENT

Figure 1:
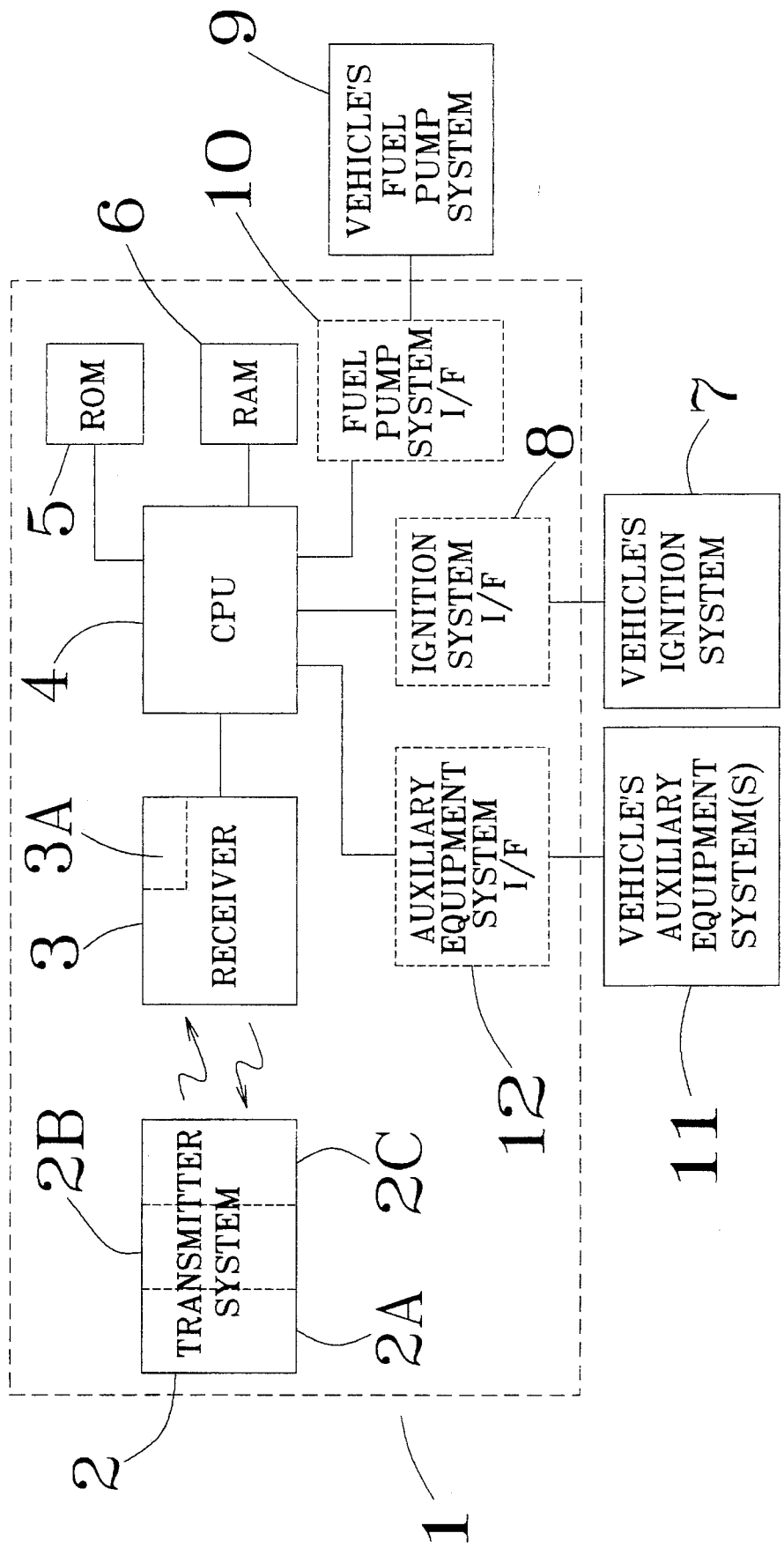
FIG. 1 illustrates a block diagram of the apparatus which is the subject of the present invention.

FIG. 1 illustrates a block diagram of the apparatus, which is the subject of the present invention and which is denoted by the reference numeral 1. As illustrated in FIG. 1, the apparatus 1 comprises a transmitter system 2, for transmitting an electrical, an electronic, or an electro-magnetic signal upon an activation by a motor vehicle owner or authorized operator, hereinafter referred to collectively as the "authorized operator".

The transmitter system 2 consists of a user interface device 2a and a transmitting device or transmitter 2b. The transmitter also has a receiver 2c for receiving signals as will be described below. The user interface device 2a provides the means by which the authorized operator may access or activate the apparatus 1, as well as the means by which the authorized operator may enter command codes into the transmitter system 2. The transmitter 2b transmits a signal, in response to the authorized operator's accessing or activation of the apparatus 1.

The transmitter system 2 is a remote system, which is not electrically connected to the remainder of the apparatus 1. Further, the transmitter system 2, in the preferred embodiment, is not located in the motor vehicle, but rather, is external from, and separate and apart from, the motor vehicle. In the preferred embodiment, the transmitter system 2, is designed to be capable of transmitting signals over long distances, i.e. tens or even hundreds of miles or farther. The transmitter system 2, in the preferred embodiment, is also capable of transmitting a multitude of signals. As will be explained below, this capability to transmit a multitude of signals allows for the transmission of multiple command codes to the apparatus 1, which in turn, provides for an apparatus which may provide a multitude of responses in the control and operation thereof.

Referring once again to FIG. 1, the apparatus 1 also comprises a receiver 3, for receiving the signals which are transmitted by the transmitter system 2. The receiver 3 may be any receiver which is capable of receiving the remote electrical, electronic and/or electro-magnetic signals, which may be transmitted by the transmitter system 2. In the preferred embodiment, the receiver is also capable of receiving any of the multitude of signals which may be transmitted by the transmitter system 2.

The transmitter system 2/receiver 3 combination, of the apparatus 1 is implemented, in the preferred embodiment, by a telephone/telephone beeper system which systems are well known in today's telecommunication industry and practices. In such a telephone/telephone beeper system, the transmitter 2 can be any touch-tone telephone which serves as a means for a user interface, in the form of pushbuttons, or the like, for entering a data code or sequence, and which may provide a means by which to transmit a signal, in response to the entered data, to a receiver device which is typically a telephone beeper.

The receiver 3 or beeper, or the communication system servicing same, in turn, provides an indication, in the form of a signal transmission, back to the receiver, which signifies that a signal has been received. The receiver 3 also generates data which is indicative of the signal, or a portion thereof, which has been received. In this regard, the receiver 3 may be provided with its own transmitter 3a, or the communication system which services the receiver may provide a transmitter (not shown), for transmitting signals back to the transmitter system 2.

It should be noted that the telephone/telephone beeper system may be replaced with any other type of transmitter/receiver combination which provides for the transmission of a multitude of remote signals over long distances.

In the preferred embodiment, upon receiving the signal, the receiver 3, generates a distinct digital signal, which is indicative of the receiver 3 receiving the transmitted signal, and which is transmitted from the receiver transmitter 3a to the transmitter system 2, and in particular, to the transmitter receiver 2c.

At least a portion of the signal transmitted from the transmitter system 2 to the receiver 3 includes a valid access code signal, which accesses the receiver 3, and the apparatus 1, which access code serves to provide security measures which must be taken in conjunction with the use of the apparatus 1.

The apparatus also comprises a controller or a central processing unit CPU 4, which is electrically connected with the receiver 3 and which receives, or reads, the digital signal or signals, or portions thereof, which are generated by the receiver 3. The CPU 4 may be any type of digital processing device. In the preferred embodiment, the CPU 4 is implemented by a microprocessor. The CPU 4 also has associated therewith a read only memory device (ROM) 5, for storing operational program data, and a random access memory device (RAM) 6, for storing processing data, which is received by the receiver 3 and which is processed by the apparatus 1 in the manner described below.

The use of a microprocessor as the CPU 4 provides for versatility in apparatus programmability, as well as facilitates an apparatus which can be made as small in size as possible. It is important to note, that the CPU 4 may also be implemented by a micro-computer, a mini-computer or any other digital computer system, along with the requisite associated memory devices. However, it should be noted that, the provision of an apparatus which is as small as possible allows for an apparatus which may be more easily installed and concealed, so as to prevent its being located and defeated by a car thief. It is also envisioned that the apparatus 1 may be installed in the motor vehicle during the vehicle's manufacture or assembly so as to insure that it is not easily detectable or accessible by a car thief. The more concealable the apparatus, the less likelihood that it could be located and defeated. It is envisioned that the apparatus 1 and any associated circuitry and/or wiring may be designed into the motor vehicle so as to be inaccessible to a thief.

The CPU 4 is electrically connected to the motor vehicle's ignition system 7, which is located externally from the apparatus 1. The CPU 4 may or may not be connected with the vehicle's ignition system 7 through an ignition system interface 8 which is shown in dotted lines. The CPU 4 may transmit signals to, as well as receive signals from, the vehicle's ignition system 7. In this manner, the CPU 4 and the vehicle's ignition system 7 can exchange information back and forth between each other. In this manner, the CPU 4, upon receiving an appropriate signal from the receiver 3, and upon the completion of the requisite data processing routine, which will be described below, can issue a digital command signal to the vehicle's ignition system 7. This digital command signal may be one which will disable the vehicle's ignition system 7 or one which will re-enable or reset the vehicle's ignition system 7.

In the preferred embodiment, the CPU 4 is also electrically connected to the motor vehicle's fuel pump system 9 which is also located externally from the apparatus 1. The CPU 4 may or may not be connected with the vehicle's fuel pump system 9 through a fuel pump system interface 10 which is also shown in dotted lines. In the case of an electrical or an electronic fuel pump system, the CPU 4 may provide an electrical signal which will disable or re-enable the vehicle's fuel pump system 9. In the case of a mechanical fuel pump system, the CPU 4 may provide an electrical signal which will disable or re-enable an electrical valve system, which may be used to control the mechanical fuel pump system. Whichever the case may be, the CPU 4 will be capable of issuing an electrical signal to disable or to re-enable the vehicle's fuel pump system 9.

The CPU is also electrically connected to a vehicle's auxiliary equipment system or systems 11, which are optional. The vehicle's auxiliary equipment system or systems 11 are located externally from the apparatus 1 and may or may not be connected with the CPU 4, via a vehicle's auxiliary equipment system or systems interface 12, which is shown in dotted lines in FIG. 1.

The vehicle's auxiliary equipment system or systems 11 may include a loud siren or alarm, which may be located in the passenger compartment of the motor vehicle and, which may produce a loud piercing sound so as to make it unbearable for an intruder to remain inside the motor vehicle passenger compartment. The vehicle's auxiliary equipment system 11 may also include an external siren or alarm, which may produce a loud piercing sound, which may be utilized to draw attention to the motor vehicle. The auxiliary equipment system 11 may also include a horn, which may blare continuously or intermittently, so as to also draw attention to the motor vehicle.

The vehicle's external light system(s), which may include the vehicle's head lights, tail lights or flashers, which may be constantly illuminated or which may blink on and off repeatedly to draw attention to the motor vehicle, may also be utilized as a vehicle auxiliary equipment system 11. The vehicle auxiliary equipment system 11 may also include a power door lock system, for securing the vehicle's passenger compartment so as to prevent an entry thereto or an exit therefrom. In addition, the vehicle auxiliary equipment system 11 may include a hood locking system, such as a mechanical hood locking system, for locking the vehicle's hood so as to prevent an unauthorized access into the vehicle's engine compartment. The hood locking system, may prevent any tampering with the apparatus 1 or with other systems and/or components of the motor vehicle.

As noted above, the vehicle's auxiliary equipment system or systems 11 and their associated interface devices 12, are optional. The vehicle's auxiliary equipment system or systems 11 receives signals from the CPU 4, which signals serve to activate or de-activate, or vice versa, as the case may be, the vehicle's auxiliary equipment systems which are utilized in conjunction with the apparatus 1. The vehicle's auxiliary equipment systems 11 may also include any other vehicle system or equipment feature which may be utilized to draw attention to the motor vehicle or in some other way impede the vehicle's theft. It should be noted that any of the interface devices 8, 10 and 12 may include any of the requisite interfacing circuitry which may be necessary to facilitate CPU 4 control over the respective systems.

The operation of the apparatus 1 of the present invention is described below with reference to the flow diagram illustrated in FIG. 2, which flow diagram illustrates the method of the present invention which is utilized in conjunction with the apparatus 1. The method of the present invention may be implemented as a computer program or software program which is used in conjunction with the CPU 4.

Upon the occurrence, or the discovery thereof, of the theft of a motor vehicle, the authorized operator of the motor vehicle may activate the apparatus 1 by entering an access code into the transmitter interface 2a which may be a touch tone telephone keypad. The entry of a valid access code will activate a signal transmission from the transmitting device 2b. In the preferred embodiment, the above sequence of events may occur by the authorized operator simply going to a touch-tone telephone, which may be a public pay phone or a private phone, and by punching or entering in the predetermined access code which is assigned to the apparatus 1.

In the case of a touch-tone telephone/telephone beeper system, wherein the beeper is the receiver, this access code would typically be a code which would comprise a given telephone area code and telephone number for the beeper (receiver 3).

Upon receiving the transmitted signal, the receiver 3, or beeper, or the communication system servicing the beeper, will typically generate, via transmitter 3a, which may or may not be an integral part of the receiver 3, an electrical signal which is indicative of the receiver 3 having received the signal from the transmitter 2 and which further indicates that the receiver 3 has been accessed. In the case of a communication system which services the beeper, the transmitter 3a may be located externally from the apparatus 1. This signal is also typically sent to the CPU 4 so as to alert the CPU 4 that the receiver 3 has been accessed. The receiver 3, or the communication system servicing the receiver (beeper), will transmit a signal, via its transmitter 3a, to the transmitter receiver 2c which is indicative of the fact that receiver 3 has been accessed. This signal to the transmitter receiver 2c usually takes the form of an audible tone at the telephone headset.

The above sequence is analogous to the operation of a telephone/telephone beeper system wherein, when the beeper, or the communication system servicing the beeper, has answered the call, the beeper awaits entry of a telephone number or code by the caller. The signal indication by the receiver 3 will then be followed by a period of silence during which period, the authorized operator may enter the desired data command code or command code, which may include a vehicle disable command code, a vehicle re-enable or reset command code, or a cancel code, etc. The authorized operator then enters the code or number sequence into the transmitter interface 2a or, in this case, the telephone keypad.

In a case when the motor vehicle has been stolen, the command code will be a vehicle disable command code. It should also be noted that a vehicle re-enable or reset command code, or any other code, which would represent an apparatus function or operation, may also be entered, as the circumstances may require, at this time. The command code is then transmitted from the transmitting device 2b of the transmitter system 2 and is received by the receiver 3 or beeper. In the preferred embodiment, a command code receive signal is then transmitted back to the transmitter system 2, via the receiver or, communication system, transmitter 3a, which provides an indication, to the authorized operator, that the command code has been received by the apparatus 1.

The command code data is then transmitted to, or read by, the CPU 4 for command code identification and for further processing, if necessary. In this manner, an authorized operator, upon learning of the theft of the motor vehicle, can easily access or activate the apparatus 1 by simply going to the nearest touch-tone telephone and "calling up" the anti-theft or theft-deterrent apparatus 1. It is important to note that the telephone/telephone beeper system, described above, may be replaced with any remote transmitter/receiver system, such as by a remote transmitter, i.e., a television-type remote control unit, which has a user interface feature and which can remotely transmit a multitude of signals over long distances to an associated receiver.

By utilizing a telephone/telephone beeper system, in the preferred embodiment, a long range, remote-controlled system may be achieved which systems are usually very well maintained by telecommunication companies or carriers and which are also very reliable. By using a telephone/telephone beeper system, the authorized operator does not have to keep track of a separate remote control unit. In this manner, a reliable apparatus communication system is achieved. Further, if the authorized operator should leave the remote control unit in the vehicle, or should lose it, the apparatus 1 will still be accessible by the authorized operator. Still further, some telephone/telephone beeper systems may have effective ranges on the order of hundreds of miles, which may be more economical and reliable for long range signal transmission than other conventional remote transmitter/receiver systems.

In the case where the motor vehicle has been stolen, and the authorized operator wants to prevent or thwart the theft, the command code to be entered is a vehicle disable command code (disable code) which will disable the vehicle in the manner described below. Similarly, if the authorized operator wants to re-enable or reset the apparatus 1, such as when the motor vehicle has been recovered or found, so as to render the motor vehicle re-enabled, the command code to be entered will be a vehicle re-enable or reset command code (re-enable or reset code). Once the command code has been entered, the receiver 3, via its transmitter 3a, will provide a signal indication to the transmitter system 2, which may take the form of audible tones to a headset, as is known in beeper systems, which will serve to confirm receipt of the command code by the receiver 3 and the apparatus 1. The data entered into, and transmitted from, the transmitter system 2, and received by the receiver 3, will then be transmitted to, or read by, the CPU 4 for command code identification and for subsequent processing, if necessary.

Figure 2:
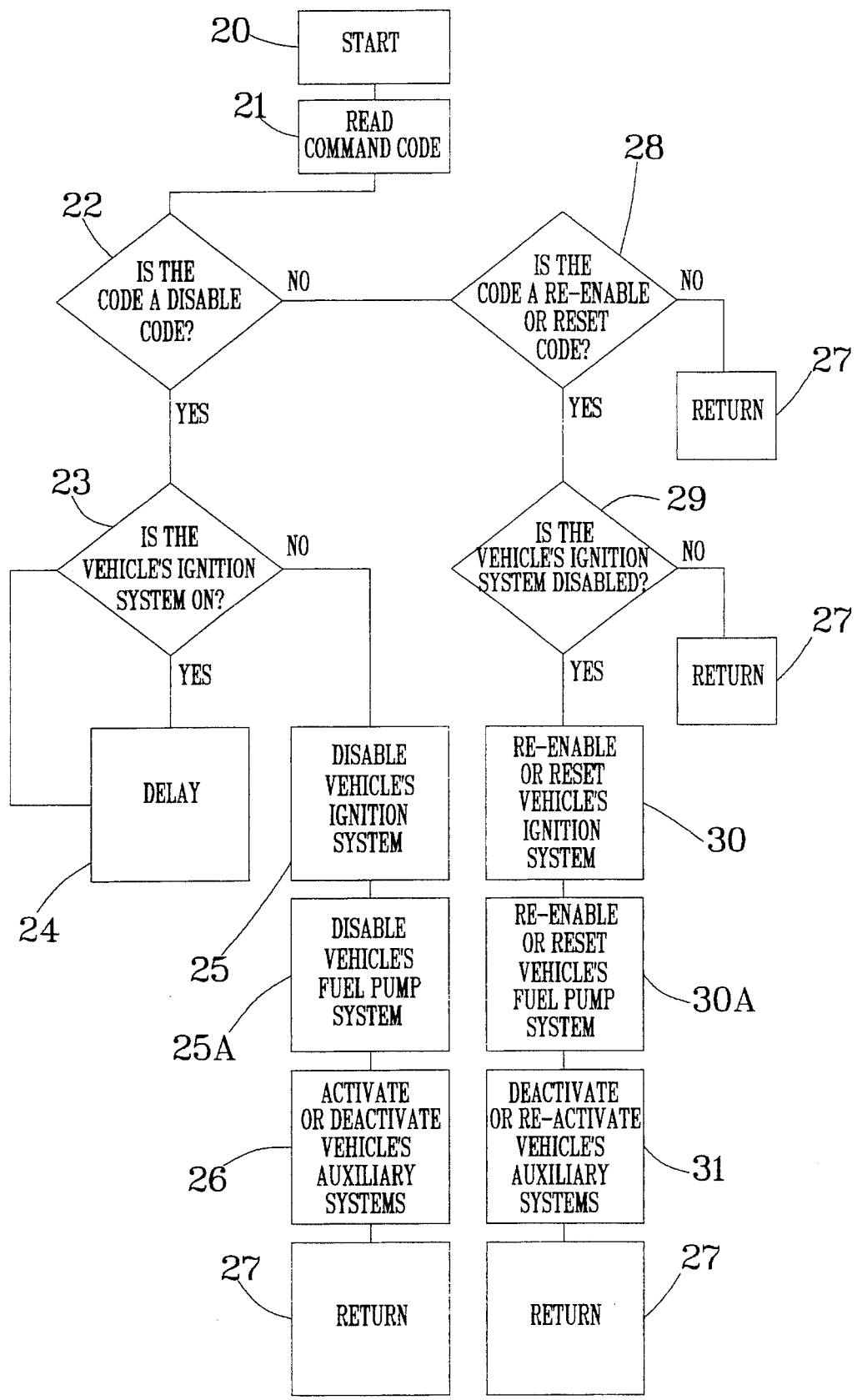
FIG. 2 illustrates a flow diagram of the operation of, or method utilized in conjunction with, the apparatus of FIG. 1.

With reference to FIG. 2, the receiver 2, upon receipt of the access code, will generate an interrupt in the CPU 4 which will activate an operational program routine or an interrupt service routine, at step 20, of the flow diagram. At step 21, the command code data, upon receipt by the receiver 2, is then transmitted to, or read by, the CPU 4. The CPU 4 will then, at step 22, begin to perform a processing routine in order to identify the command code.

The command code should be of a pre-determined length and should be chosen to be one of three types of codes. The command code may be a valid disable code, a valid re-enable or reset code, or any other code which is not recognized as being valid by the CPU 4 and which may be utilized to indicate a cancel operation, or a false alarm. An incomplete code, an invalid code, or the absence of a command code after the apparatus has been accessed, will be deemed to be a false alarm. The cancel and false alarm categories are utilized in order to enable an authorized operator to cancel apparatus access or activation or to prevent an unauthorized access or unauthorized attempt to enter a command code. Such an identification processing routine may be performed in a very simple manner, such as by testing the command code or code data against the pre-determined codes or code data which are stored in program memory. Such testing may be performed by any one of the known software testing routines.

Once the command code, if entered, is identified, the CPU 4, under the control of the operational program, will perform the appropriate apparatus control functions. If a valid disable code is identified as being received by the receiver 3, at step 22, the CPU 4, which is connected with the vehicle's ignition system 7, so as to send and receive data to and from the vehicle's ignition system 7, will perform a software test, at step 23, in order to determine whether the vehicle's ignition system 7 is activated or on. This will require a monitoring of the vehicle's ignition system 7 by the CPU 4. As noted above, a vehicle ignition system interface 8 is optional and may or may not be employed in order to facilitate this monitoring function and the controlling of the vehicle's ignition system 7 by the CPU 4.

If the vehicle's ignition system 7 is activated or on, the CPU 4 will enter into a delay loop, at step 24. The purpose of the delay loop, at step 24, is to prevent the vehicle's ignition system 7 from being shut down while the vehicle's engine is on or running. Such a test and delay loop routine serves to prevent accidents, such as those caused when a vehicle suddenly looses power while traveling at a moderate, or at a high, rate of speed or when the loss of engine power results in the failure of the vehicle's power steering and/or power brake systems. In this manner, the CPU 4 will interrogate the vehicle's ignition system 7 after a pre-determined delay period, and will continue to do so until the vehicle's ignition system 7 is determined to be shut-off and inactive.

While any delay period may be used, at step 24, and may be programmed into the program software of the apparatus 1, it is important to choose a delay period which can detect even the shortest duration of a vehicle ignition system shut-down. In the preferred embodiment, a delay period of one second is selected. This of course may be changed in the program software, as desired.

After the delay, at step 24, the CPU 4 will again interrogate the ignition system 7, at step 23, and will continue to do so in the above described delay loop routine until the ignition system 7 is determined to be shut-off or inactive. Once it has been determined that the vehicle's ignition system 7 is shut-off or inactive, the CPU 4, at step 25, will issue a disable signal to the vehicle's ignition system 7.

The disable signal issued by the CPU 4, at step 25, will disable the vehicle's ignition system 7, thereby preventing a restarting of the vehicle's engine. The disabling function may be performed by the CPU 4 by issuing a data signal, which causes the vehicle's ignition system circuitry to be shut-off or be "opened", such as by opening a series switching device i.e. a switch or relay (not shown) or by issuing a disabling signal to the digital or logic devices, which may be utilized in connection with the vehicle's ignition system's electronic command computer or other electrical components or systems. It should be noted that any number of methods may be used, in conjunction with the apparatus 1, for disabling the vehicle's ignition system 7. The CPU 4 can be utilized to provide controlling signals, to disable or re-enable, the vehicle's ignition system 7 just as any microprocessor-based digital system provides control over peripheral devices. The techniques utilized, in order to provide such control over the motor vehicle's ignition system 7, may be determined on a vehicle-by-vehicle basis.

Once the vehicle's ignition system 7 has been disabled, only the issuance of a valid re-enable or reset command code signal, to the apparatus 1, may re-enable or reset the vehicle's ignition system 7. In this manner, a carefully concealed and installed placement of the apparatus 1, within the motor vehicle, will provide for a completely disabled vehicle until such time as a valid access code, followed by a valid re-enable or reset command code, is entered by the authorized operator in the manner described above. As can be readily appreciated, a carefully concealed apparatus 1, along with a strategically placed ignition cut-off circuitry or system, would render it most difficult, if not impossible, for the thief or thieves to defeat the apparatus 1.

The CPU 4, at step 25A, will then issue a disabling signal to the vehicle's fuel pump system 9 thereby de-activating the vehicle's fuel pump system 9 and prohibiting the supply of fuel to the vehicle's engine. The disabling signal from the CPU 4 can disable the vehicle's fuel pump system by any one of the known methods for disabling a fuel pump system. In the case of electric fuel pump systems, said systems may be disabled by any one of the known methods for shutting-off or "opening" an electrical circuit, which provides the power to the fuel pump system, such as by a cut-off switch or relay, which methods may also be the same methods which are utilized in connection with disabling the vehicle's ignition system 7.

In the case where electronic components are utilized, the digital components or logic gates in the control circuitry may also be disabled. In the case of a mechanical fuel pump, an electric valve assembly, which may provide a fuel pump cut-off, may be utilized thereby allowing any appropriate method for disabling an electrical fuel pump system, to be utilized in order to disable the electric valve assembly, and ultimately, to shut-off or disable the mechanical fuel pump system. The vehicle fuel pump system interface 10 may be utilized, if necessary, in order to facilitate the above described disabling technique(s). The CPU 4 can be utilized to provide controlling signals, to disable or re-enable, the vehicle's fuel pump system 9 just as a microprocessor-based digital system provides control over peripheral devices. It should be noted that the techniques utilized, in order to provide control over (disable or re-enable) the vehicle's fuel pump system 9, may be determined on a vehicle-by-vehicle basis.

Upon the disabling of the vehicle's ignition system 7, at step 25, and the vehicle's fuel pump system 9, at step 25A, the CPU 4, at step 26, will then issue control signals to activate or de-activate, whichever the case may be, the various vehicle auxiliary equipment systems 11, which are utilized in conjunction with the apparatus 1. As noted above, the vehicle's auxiliary equipment systems 11, if employed, may include an alarm or siren, which has a piercing sound and which is placed in the interior of the passenger compartment. The alarm or siren would serve to make it unbearable for the thief or thieves to remain inside the vehicle. External alarms or sirens may also be used in order to draw attention to the vehicle. A horn or horns, which could blare continuously or intermittently, could also be used to draw attention to the vehicle.

A vehicle's light systems, i.e. head lights, tail lights, parking lights, etc. may also be activated so as to illuminate continuously or intermittently, such as by blinking, in order to draw attention to the motor vehicle. Other vehicle auxiliary equipment systems, such as a power door locking system, may be activated, immediately or after a delay, for securing the vehicle's passenger compartment so as to prevent an entry thereto or an exit therefrom. As noted above, there may be a delay between the disabling of the vehicle's ignition system and the activation of the power door lock system so as to allow the thief or thieves to get out of the car before the locking operation takes place.

It is also envisioned that a mechanical hood locking system may be utilized and activated so as to lock the hood and prevent an unauthorized access into the vehicle's engine compartment. Such a vehicle hood locking feature could prevent tampering with the apparatus 1 or with other systems and/or components of the motor vehicle.

The CPU 4 can be utilized to provide controlling signals to activate or de-activate any of the vehicle's auxiliary equipment systems 11 just as a microprocessor-based digital system provides control over peripheral devices. Such techniques may be similar to how the CPU 4 provides control over the vehicle's ignition system 7 and the vehicle's fuel pump system 9. It should be noted that the techniques utilized, in order to provide control over the vehicle's auxiliary equipment systems 11, may be determined on a vehicle-by-vehicle basis.

Once disabled the vehicle's ignition system 7, and the vehicle's fuel pump system 9, will remain disabled even if the vehicle's power supply should be drained. This is due to the fact that the digital circuitry, which is utilized in the apparatus 1, and in the vehicle's ignition system 7 and the vehicle's fuel pump system 9, may include digital devices such as logic gates, flip-flops, etc. and/or electro-magnetic devices, such as switches or relays, which may be chosen so as to remain in their state unless altered electrically or electronically or under the power of an electrical signal or stimulus. Further, even if the vehicle's power is completely drained, these above mentioned devices, which may be chosen to require electrical power in order to change their state, or their operating mode or position, would not be activated and thus, the vehicle's ignition system 7, and the vehicle's fuel pump system 9, will remain in a disabled state.

Supplemental power supplies, such as batteries, etc, may also be utilized with the apparatus 1 so as to prolong the continued activation or de-activation of the vehicle's auxiliary equipment systems 11 which are utilized. Supplemental power systems are optional and may also be employed with the apparatus 1 so as to provide any unusual power requirements which may be required by the motor vehicle in which the apparatus 1 may be installed.

Upon the completion, at step 26, the CPU 4 will then exit the operational program routine at step 27. This signifies the completion of the interrupt service routine. The CPU 4 will then await the next apparatus accessing and activation by the authorized operator, via entry of a valid access code into the transmitter system 2 as described above. Unless a valid access code, followed by a valid re-enable or reset command code, is entered into the transmitter interface 2a, the vehicle's ignition system 7, and the vehicle's fuel pump system 9, will remain disabled and the vehicle's auxiliary equipment systems 11, will remain in their activated or de-activated states.

Upon the motor vehicle being found or recovered, the authorized operator can once again access the apparatus 1 by entering the valid access code into the transmitter interface 2a and then by entering the valid re-enabling or reset command code. As described above, a valid access code will once again initiate the operation of the operational program or interrupt service routine, which is described above. The valid re-enable or reset command code will be received by the receiver 3, in the manner described above.

The command code data will then be transmitted to, or read by, the CPU 4, at step 21. The CPU 4, at step 22, will then determine whether the command code, which was entered, is a valid disable code. If it is determined that the command code is not a disable code, the CPU 4 will, at step 28, determine whether the command code is a valid re-enable or reset command code.

If the command code is not a valid re-enable or reset command code, the CPU 4 will exit the program, at step 27, and will await the next accessing and activation of the apparatus 1. If however, the entered command code is identified as a valid re-enable or reset code, the CPU 4, subsequent to this identification, but prior to actually re-enabling or resetting the vehicle's ignition system 7, re-enabling the vehicle's fuel pump system 9, and de-activating or re-activating, whichever the case may be, the vehicle's auxiliary equipment systems 11, will perform a test, at step 29, in order to verify that the vehicle's ignition system 7 is, in fact, still disabled. This test, at step 29, is a safety feature which serves to ensure that no re-enabling or resetting signal will be issued by the apparatus 1 if the vehicle's ignition system 7 is not disabled. In this manner, the operation of the vehicle's ignition system 7 will not be interrupted, which interruption may be unsafe.

It should be noted that neither the vehicle's fuel pump system 9 nor any of the vehicle's auxiliary equipment systems 11, if utilized, are checked, as their interruption during normal vehicle operation may also be unsafe. If the vehicle's ignition system 7 is determined to be disabled, at step 29, the CPU 4 will, at step 30, issue a control signal which will re-enable or reset the vehicle's ignition system 7. This may be accomplished by any method which would re-enable or re-activate the vehicle's ignition system circuitry. The CPU 4, at step 30A, will then issue a control signal to re-enable or reset the vehicle's fuel pump system 9 which may also be accomplished by re-enabling or re-activating the vehicle's fuel pump system circuitry. The CPU 4, will then, at step 31, issue control signals to the vehicle's auxiliary equipment systems 11 so as to de-activate or re-activate those systems which were activated or de-activated, respectively, earlier at step 25. Upon the completion of the above-described events, the vehicle will then be ready for operation, barring any need for service and/or for repairs. The CPU 4, upon the completion of step 31, will then exit the operational program or interrupt service routine, at step 27, and will await the next valid accessing and activation of the apparatus 1.

If the re-enable or reset command code is not a valid code, the CPU 4 will ignore the received data, will exit the operational program or interrupt service routine, at step 27, and will await the next valid accessing and activation of the apparatus 1. If an invalid command code is entered into the transmitter interface 2a, such as by an authorized operator who has made a mistaken entry, or who is trying to cancel the accessing and activation of the apparatus 1, or by an unauthorized person attempting to gain unauthorized access to the apparatus 1, the CPU 4 will receive, or read in, the code, at step 21, of FIG. 2, will identify the code as an invalid command code, will ignore the command code transmission, and will exit the operational program or interrupt service routine, at step 27. The CPU 4 will then await the next valid accessing and activation of the apparatus 1. In this manner, the apparatus 1 serves to prevent an unauthorized or unwanted disabling or re-enabling or resetting of the vehicle's ignition system 7 and the vehicle's fuel pump system 9 along with the activation or the de-activation of the vehicle's auxiliary equipment systems 11.

The above safeguards will also prevent a wrong or misdialed number from accidently accessing and activating the apparatus 1 which may result in the disabling or re-enabling, or the activating or de-activating, of the respective vehicle systems. These safeguards may be provided at the access code level of transmission and/or at the command code level of transmission.

In the above described manner, the apparatus and the method of the present invention provide for an apparatus and a method for allowing an authorized operator of a motor vehicle to safely surrender the motor vehicle under force, or threat of force, while affording the authorized operator the opportunity to prevent or seriously thwart the motor vehicle theft from a safe location or vantage point. In this regard, a safe and effective anti-theft and/or theft-deterrent device is provided by the present invention.

While, in the above description, the operation of the present invention has been described in conjunction with the use of a valid disable command code and a valid re-enable or reset command code, it is also envisioned that a number of valid disable command codes and/or a number of valid re-enable or reset command codes may be utilized, wherein each different disable code or re-enable or reset code may selectively disable or re-enable or reset any one or any combination of the vehicle's systems, such as the vehicle's ignition system 7, the vehicle's fuel pump system 9, or any one or more of the vehicle's auxiliary equipment systems 11. In this manner, the authorized operator may utilize the present invention to selectively disable, re-enable, de-activate or re-activate any one of the systems, or a combination thereof, at his or her discretion. In this case, however, the operational program or interrupt service routine would have to be modified so as to provide for the identification of each of these valid codes, and the operational program or interrupt service routine would also have to be modified so as to provide for the appropriate CPU 4 and apparatus 1 response to each of these valid codes. By utilizing a multitude of disable codes and/or re-enable or reset codes, each affecting different vehicle's systems, or combinations thereof, it is possible to selectively control the vehicle's systems from a remote location. This feature provides for greater versatility in the utilization of the apparatus 1.

By providing the capability for utilizing different disable codes and/or re-enable or reset codes, the authorized operator may utilize the apparatus 1 of the present invention so as to disable or re-enable or reset the vehicle's ignition system 7 and the vehicle's fuel pump system 9, at any time, so as to disable the vehicle without activating or de-activating any of the vehicle's auxiliary equipment systems 11, and therefore, without drawing attention to the motor vehicle.

This feature would enable an authorized operator to disable or re-enable or reset the vehicle's ignition system 7, the vehicle's fuel pump system 9, and/or activate or de-activate any one or more of the vehicle's auxiliary equipment systems 11, so as to disable the motor vehicle at any time. In this manner, the authorized operator can disable the vehicle nightly, while at work, or at any other time, simply by accessing and activating the apparatus 1 by using a touch tone telephone. Since the vehicle's ignition system is usually off at these times, the disabling, and subsequent re-enabling of these systems will occur as described above with regards to FIG. 2. In this manner, the present invention may provide an effective means by which to "lock-up" a motor vehicle, at any time, and even when the vehicle is in the rightful possession of the owner or authorized operator.

Figure 3:
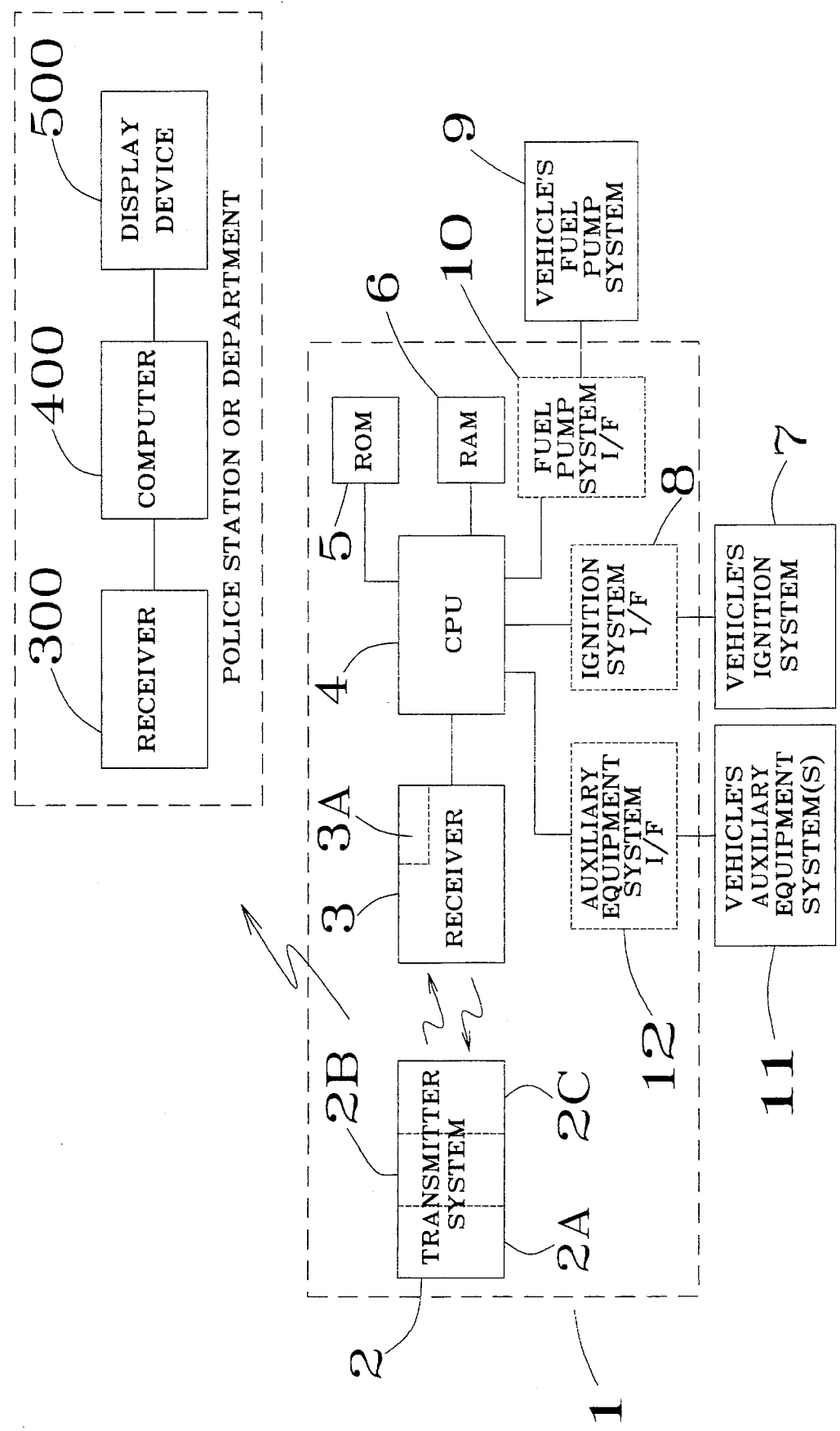
FIG. 3 illustrates an alternate embodiment of the present invention wherein the present invention may be utilized in conjunction with a local law enforcement office or agency.

It is also envisioned that the apparatus and method of the present invention may be utilized in conjunction with local law enforcement offices or agencies in order to provide a prompt means by which to report a vehicle theft and to allow for a prompt law enforcement response thereto. FIG. 3 illustrates a system whereby the present invention may be utilized in conjunction with local law enforcement offices or agencies. In FIG. 3, a receiver 300 is utilized in conjunction with the apparatus 1. The receiver 300, however, is located at a local law enforcement office or agency, which in the preferred embodiment, can be a local police station or police department.

The receiver 300 may, but need not, be identical to the receiver 3 which is utilized in the apparatus 1. The receiver 300 may be capable of receiving transmissions i.e. access codes and command codes, for any one or for any number of vehicles which may be registered with the police station or department. The receiver 300 must be capable of receiving the access code and command codes for a given registered apparatus. In the embodiment of FIG. 3, a computer 400, which is also located at the police station, is connected to the receiver 300. A display device or interface device 500 is also connected to, and used in conjunction with, the computer 400.

It is envisioned that motor vehicle owners or authorized operators will register their vehicle identification information with their local police station or department along with the access code and command codes for their apparatus 1. The receiver 300 could then be programmed to receive the access code and the command codes for each registered vehicle. The computer 400 could store the vehicle identification information so that the identification information can be correlated with the access code and command code information. In this manner, the police station or department would have a data base of vehicle information which would correspond with the valid access codes and command codes which may be received.

The embodiment illustrated in FIG. 3 operates in the following manner. When a theft of a motor vehicle has occurred, or has been discovered, the authorized operator can access and activate the apparatus 1 in the manner described above. In this embodiment, however, the signal transmitted from the transmitting device 2b, will be received by both the receiver 3, in the vehicle apparatus 1, and by the receiver 300 at the police station or department. Upon being given the opportunity to enter the command code, the authorized operator will then enter the disable command code. Again, the transmitting device 2b will transmit signals corresponding to the disable command code. These signals will also be received by both the receiver 3, in the vehicle apparatus 1, and by the receiver 300 at the police station or department.

The signals, which are received by the receiver 300, will be transmitted to, or read by, the computer 400. The computer 400 will process this data independently of the processing which takes place in the apparatus 1. The computer 400 will perform its processing routines in order to identify the vehicle in which the apparatus 1 is installed. The computer 400 will also identify the command code.

If a valid disable command code has been entered, the computer 400 will alert the police, via the display device 500, of the car theft. If a re-enable or a reset command code, or any code for that matter, is received, the police could also be alerted so as to verify the situation with the authorized operator of the motor vehicle. Invalid codes may also be checked out by the police.

The above-described alternate embodiment, wherein the present invention is utilized in conjunction with local law enforcement efforts, allows for a prompt and immediate reporting of a motor vehicle theft while also allowing the authorized operator to take any of the possible steps by which to prevent the vehicle theft from a safe location and/or vantage point. Law enforcement efforts could be greatly assisted and enhanced as information which identifies the motor vehicle would be immediately available to the local police. This in turn, would provide the police with a head start in apprehending the thief or thieves and recovering the stolen motor vehicle.

It is also envisioned that the apparatus and method of the present invention may find application in areas other than in motor vehicle anti-theft and/or theft deterrent systems. For example, the present invention may also find application in home security systems, and the like, wherein a long-range remote-controlled system may be utilized in order to provide an immediate, or a deferred, response to a theft situation and/or to provide control over desired items or devices.

While the present invention has been described in a preferred embodiment, such description is merely illustrative of the present invention and is not to be construed as a limitation thereof. In this regard, the present invention encompasses all modifications, variations and/or alternate embodiments with the scope of the present invention limited only by the claims which follow.

What is claimed is:

1. A remote-controlled anti-theft system for motor vehicles, comprising:

a means for transmitting a non-voice signal to at least two remote locations;

a first receiving means for receiving said non-voice signal at a first of said at least two remote locations;

a second receiving means for receiving said non-voice signal at a second of said at least two remote locations;

a first control means for processing said signal received by said first receiving means, wherein said first control means issues a control signal to one of a vehicle, a vehicle's ignition system, a vehicle's fuel pump system or a vehicle's auxiliary equipment system; and a second control means for processing said non-voice signal received by said second receiving means, wherein said second control means provides information indicative of at least one of the identification of a vehicle, a theft of a vehicle or a function to either control or to be performed by said one of a vehicle, a vehicle's ignition system, a vehicle's fuel pump system, or a vehicle's auxiliary equipment system, in response to said non-voice signal, wherein at least one of said at least two remote locations is at least one of a security office, a law enforcement office, or a law enforcement agency.

2. The system of claim 1, wherein at least one of said at least two remote locations is in a motor vehicle.

3. The system of claim 1, wherein said transmitting means is a touch-tone telephone.

4. The system of claim 1, wherein at least one of said first receiving means or said second receiving means is a telephone signal receiving means.

5. The system of claim 1, wherein said at least one of said first control means or said second control means comprises one of a microprocessor, a micro-computer, or a mini-computer.

6. The system of claim 1, wherein said vehicle's auxiliary equipment system is one of an alarm, a horn, a door locking system or a hood locking system.

7. The system of claim 1, wherein said signal comprises at least one of system accessing data or system control data.

8. A remote-controlled anti-theft system for motor vehicles, comprising:

a means for registering a motor vehicle with at least one of a security office, a law enforcement office, or a law enforcement agency;

a means for transmitting a non-voice signal to at least two remote locations;

a first receiving means for receiving said non-voice signal at a first of said at least two remote locations;

a second receiving means for receiving said non-voice signal at a second of said at least two remote locations;

a first control means for processing said non-voice signal received by said first receiving means, wherein said first control means issues a first control signal to at least one of a vehicle, a vehicle's ignition system, a vehicle's fuel pump system, or a vehicle's auxiliary equipment system; and a second control means for processing said non-voice signal received by said second receiving means, wherein said second control means issues a second control signal, wherein said second control signal comprises information indicative of at least one of a vehicle identification, theft of the vehicle or a function to either control or to be performed by said one of a vehicle, a vehicle's ignition system, a vehicle's fuel pump system, or a vehicle's auxiliary equipment system, in response to said non-voice signal, wherein at least one of said at least two remote locations is said at least one of a security office, a law enforcement office, or a law enforcement agency.

9. The system of claim 8, wherein at least one of said at least two remote locations is in a motor vehicle.

10. The system of claim 8, wherein said transmitting means is a touch-tone telephone.

11. The system of claim 8, wherein at least one of said first receiving means or said second receiving means is a telephone signal receiving means.

12. The system of claim 8, wherein at least one of said first control means or said second control means comprises one of a microprocessor, a micro-computer or a mini-computer.

13. The system of claim 8, wherein said first control means delays an issuance of said first control signal until the motor vehicle's ignition system is determined to be off.

14. The system of claim 8, wherein said vehicle's auxiliary equipment system is one of an alarm, a horn, a door locking system or a hood locking system.

15. The system of claim 8, wherein said signal comprises at least one of system accessing data or system control data.

16. A method for remote-controlled motor vehicle theft reporting or motor vehicle recovery, comprising the steps of:

registering a vehicle with one of a security office, a law enforcement office, or a law enforcement agency;

transmitting a non-voice signal, in response to either an occurrence of or a discovery of a vehicle theft, to both of the vehicle and said one of a security office, a law enforcement office, or a law enforcement agency;

receiving said non-voice signal at each of the vehicle and said one of a security office, a law enforcement office, or a law enforcement agency;

processing said non-voice signal at each of the vehicle and said one of a security office, a law enforcement office, or a law enforcement agency; and issuing at least one control signal at either destination in response to said signal processing, wherein said at least one control signal either identifies the vehicle or provides control over either the vehicle or one of a vehicle's ignition system, a vehicle's fuel pump system, or a vehicle's auxiliary equipment system, in response to said non-voice signal.

17. The method of claim 16, further comprising the step of:

one of disabling, enabling, activating and de-activating at least one of the vehicle, the vehicle's ignition system, fuel system and auxiliary equipment system.

18. The method of claim 16, wherein said signal is transmitted simultaneously to each of said at least two remote locations.

* * * * *